United States Patent
Mishra et al.

(10) Patent No.: US 6,753,381 B2
(45) Date of Patent: Jun. 22, 2004

(54) POLYMER BLENDS AND THEIR APPLICATION AS VISCOSITY INDEX IMPROVERS

(75) Inventors: Munmaya K. Mishra, Richmond, VA (US); Raymond G. Saxton, Hanover, VA (US); Luis C. Salazar, Baton Rouge, LA (US); Gary J. Spedale, Baton Rouge, LA (US)

(73) Assignee: Ethyl Corporation, Richmond, VA (US)

( * ) Notice: Subject to any disclaimer, the term of this patent is extended or adjusted under 35 U.S.C. 154(b) by 0 days.

(21) Appl. No.: 10/099,615

(22) Filed: Mar. 15, 2002

(65) Prior Publication Data

US 2003/0176579 A1 Sep. 18, 2003

(51) Int. Cl.⁷ .......................... C08L 27/00; C08L 27/04; C08L 9/00; C10L 1/16
(52) U.S. Cl. ................ 525/240; 524/313; 508/110; 585/12
(58) Field of Search .................. 525/240; 524/313; 252/42; 585/12; 508/110

(56) References Cited

U.S. PATENT DOCUMENTS

| | | | |
|---|---|---|---|
| 3,697,429 A | | 10/1972 | Engel et al. |
| 4,340,689 A | | 7/1982 | Joffrion |
| 4,507,515 A | | 3/1985 | Johnston et al. |
| 5,391,617 A | | 2/1995 | Olivier et al. |
| 5,451,630 A | * | 9/1995 | Olivier et al. ............... 524/528 |
| 5,451,636 A | * | 9/1995 | Olivier et al. ............... 525/72 |
| 5,837,773 A | * | 11/1998 | Olivier et al. ............... 525/72 |

FOREIGN PATENT DOCUMENTS

| | | |
|---|---|---|
| EP | 0 638 611 A1 | 1/1995 |
| EP | 0637611 A2 | 8/1995 |
| WO | WO 02/10276 A2 | 2/2002 |

* cited by examiner

*Primary Examiner*—Nathan M. Nutter
(74) *Attorney, Agent, or Firm*—Dennis H. Rainear; Leah O. Robinson

(57) ABSTRACT

The present invention relates to a polymer blend containing a high ethylene content ethylene-propylene copolymer and a lower ethylene content ethylene-propylene copolymer. The polymer blend of the present invention is useful for the preparation of viscosity index improvers with improved lower temperature properties relative to conventional viscosity index improvers.

1 Claim, No Drawings

POLYMER BLENDS AND THEIR APPLICATION AS VISCOSITY INDEX IMPROVERS

FIELD OF THE INVENTION

The present invention relates to a polymer blend containing a high ethylene content ethylene-propylene copolymer and a lower ethylene content ethylene-propylene copolymer. The polymer blend of the present invention is useful for the preparation of viscosity index improvers with improved lower temperature properties relative to conventional viscosity index improvers.

BACKGROUND OF THE INVENTION

Ethylene-propylene polymers have long been known, and used for a variety of applications. For example, such copolymers, frequently referred to in the art as olefin copolymers, or OCPs, have long been recognized as viscosity index improvers in engine lubricating oils. In addition to that application, such polymers have also been widely used as impact modifiers for plastic compositions.

As used in lubricating oil compositions, ethylene-propylene polymers have the ability to provide a high thickening contribution to the lubricating oil composition with which the OCP is mixed to provide increases in the viscosity index of the overall composition. Thickening power is often defined as the difference in the kinematic viscosities of a dilute solution of an OCP mixed with oil and the diluent oil. For example, an oil solution containing from 1 to 2 percent of an OCP which provides a thickening power of 6 to 7 centistokes measured at 100° C. generally indicates acceptable viscosity index improvement performance.

For a given class of polymers, the higher the molecular weight, the higher is the viscosity of a lubricating oil containing the OCP. However, higher molecular weight polymers exhibit a greater tendency to break down under the shear and high temperature conditions normally found in engine operation, frequently resulting in the loss of viscosity. Accordingly, viscosity index improvement often depends on the balance between the thickening contribution of the OCP and its tendency to degrade, referred to as shear stability. Shear stability is typically defined as a percent viscosity breakdown on shear under a standard set of conditions. A value below 30 percent viscosity breakdown in an OCP is generally an indication that the viscosity index improver OCP is shear stable as that term is understood in the art.

Another important characteristic required for a viscosity index improver is viscosity at low temperatures, which relates to the ease of engine cranking during start-up in cold climates. An ideal viscosity index improver exhibits a negligible viscosity contribution at low temperatures while providing a large viscosity contribution at engine operating temperatures. At the same time, an ideal viscosity index improver exhibits a low tendency to degrade, and consequently a high shear stability under engine operating conditions.

Accordingly, in formulating lubricating oils to satisfy the varying conditions desired, it has generally been the practice to select those polymers which provide at the lowest cost the best overall balance of properties including viscosity at performance temperatures, shear stability and low temperature viscosity.

In the past, the art has employed as viscosity index improvers, solid amorphous ethylene-propylene polymers. When selecting ethylene-propylene polymers, a molecular weight was chosen so that the polymer would provide shear stable viscosity index improvement after the oil dispersion process.

The prior art has recognized the need to improve low temperature performance of such viscosity index improvers. For example, U.S. Pat. No. 4,507,515 describes blends of polymer compositions in which the major component has a low ethylene content and the minor component has a higher ethylene content, the minor component generally containing less than 10 percent by weight based on the weight of the blend. Similarly, U.S. Pat. No. 3,697,429 likewise describes the use of blends of high and low ethylene content polymers to achieve improvement in low temperature properties of a lubricating oil composition. One of the shortcomings of both prior art patents is that they do not describe any technique by which the major and minor components can be handled as solids.

U.S. Pat. No. 5,391,617 discloses a polymer blend with a high ethylene content ethylene-propylene polymer and a lower ethylene content ethylene-propylene polymer. That U.S. Patent does not teach or suggest the ratios of polymers of the present invention.

U.S. Pat. No. 3,697,429 discloses a mixture of two copolymers, but does not teach or suggest the ratios of polymers of the present invnetion.

Texaco Corporation developed a lubricating oil product, TXA 6070 (shear stable product) and TLA 6718 (non-shear stable product), which was a 40:60 blend of a high-ethylene:low ethylene copolymer, wherein the high-ethylene polymer of the blend had a 78.9 mol percent ethylene content.

In Canadian Patent No. 911792, there is disclosed a process for shearing high molecular weight polymers to produce a polymer having a desired molecular weight without altering the molecular weight distribution for use as a viscosity index improver. That Canadian patent does not, however, address the need for a solid shear stable polymer formed by shearing the polymer to reduce its molecular weight and its molecular weight distribution.

All patents, patent applications, and publications disclosed herein are fully incorporated by reference.

It is accordingly an object of the present invention to provide an ethylene-propylene polymer blend which overcomes the shortcomings of the prior art.

It is a more specific object of the invention to provide an ethylene-propylene polymer blend and a method for its preparation which can be used to improve the viscosity index of lubricating oil compositions as well as an impact modifier for plastic compositions in which the blend is subjected to simultaneous blending and shearing to reduce the molecular weight and sometimes the molecular weight distribution of each of the ethylene-propylene polymer components.

It is furthermore an object of the present invention to provide an ethylene-propylene polymer blend which can be prepared in conventional plastic processing equipment.

These and other objects and advantages of the present invention will appear more fully by way of the following description.

SUMMARY OF THE INVENTION

The present invention addresses the need to provide an ethylene-propylene polymer blend having the capability of functioning as a viscosity index improver. According to the concepts of the invention, the ethylene-propylene copolymer blend of the invention is the product of simple blending or a simultaneously blended and sheared blend containing a high ethylene content ethylene-propylene polymer (HEOCP) and a lower ethylene content ethylene-propylene polymer, whereby the physical properties of the sheared blend allows it to be recovered by means of conventional plastics processing equipment. The composition of the present invention in which the two components are blended or simultaneously blended and sheared can thus be used as a viscosity index improver exhibiting improved low temperature properties.

In an embodiment, the present invention resides in a blend and a process for producing that blend in which a high ethylene content ethylene-propylene polymer and a lower ethylene content ethylene-propylene polymer are subjected to blending or simultaneous blending and shearing to yield a product that can be recovered as a solid, using conventional plastic processing equipment.

In carrying out the simultaneous blending and shearing in accordance with one embodiment of the present invention, the two ethylene-propylene components undergo shearing to reduce molecular weights and sometimes molecular weight distribution (MWD), resulting in an intimate admixture exhibiting increased viscosity at ambient temperatures.

A feature of an embodiment of the present invention is to provide a polymer (also referred to herein as a copolymer) blend containing (a) an essentially amorphous low ethylene content ethylene-propylene polymer containing an ethylene to propylene mole ratio within the range of 35/65 to 65/35, having a number average molecular weight within the range of about 20,000 to about 300,000 and a molecular weight distribution within the range of about 1.3 to about 5; and (b) a partially crystalline higher ethylene content ethylene-propylene polymer containing an ethylene to propylene molar ratio within the range of about 65/35 to about 85/15, having a number average molecular weight within the range of about 40,000 to about 300,000 and a molecular weight distribution within the range of about 1.3 to about 5.0, and wherein the total mol percent ethylene content of the blend is from about 65 to about 80.

Another feature of the present invention is to provide a polymer blend with improved low temperature properties when used as a viscosity index improver in engine oil formulations.

A further feature of the present invention is to provide a polymer blend for use in viscosity index improver applications in an engine oil and exhibiting improved shear stability.

By "blend" herein is meant a physical mixture or admixture, combination, solid or liquid, solution or dispersion of components.

It is to be understood that both the foregoing general description and the following detailed description are exemplary and explanatory only and are intended to provide further explanation of the present invention, as claimed.

DETAILED DESCRIPTION OF THE PRESENT INVENTION

It has been unexpectedly found that the sheared copolymer blend of the present invention can function as a shear stable viscosity index improver with improved lower temperature properties.

The ethylene-propylene polymers used in the practice of the present invention refer to and include ethylene-propylene copolymers or copolymers of ethylene and propylene with other alpha olefins, as well as copolymers formed by the interpolymerization of ethylene, alpha olefins, and at least one other polyene monomer. Such polymers are themselves well known to those skilled in the art and are typically prepared by using conventional Ziegler-Natta polymerization techniques well known to those skilled in the art. Both types of polymers hereinafter collectively referred to as EP(D)M.

The polymer blends of an embodiment of the present invention can be compared to polymer blends of the prior art as follows:

| Item | Ethylene mol % of Partially Crystalline Higher Ethylene Content EP(D)M | % of Partially Crystalline Higher Ethylene Content EP(D)M | % Amorphous Component |
| --- | --- | --- | --- |
| Esso polymer[1] | 60–80 | 30–70 | 70–30 |
| DSM polymer[2] | 65–85 | 20–50 | 80–50 |
| Present Invention | 80.5–84 | 55–90 | 45–10 |

[1]Designates a polymer as taught in Esso's U.S. Pat. No. 3,697,429
[2]Designates a polymer as taught in DSM's U.S. Pat. No. 5,391,617

As can be seen from the above comparison, the compositions of the present invention are completely outside the scope of the identified Esso and DSM prior art documents.

As will be appreciated by those skilled in the art, while propylene is the preferred monomer for copolymerization with ethylene and optionally a diene monomer, it will be understood that in place of propylene, use can be made of other alpha-olefins containing 4 to 12 carbon atoms. The use of such higher alpha-olefins in place of propylene is well known to those skilled in the art in Ziegler technology.

When using an interpolymer of ethylene, an alpha-olefin, and a polyene monomer, use can be made of a variety of polyene monomers known to those skilled in the art containing two or more carbon-to-carbon double bonds containing 4 to 20 carbon atoms, including non-cyclic polyene monomers, monocyclic polyene monomers and polycyclic polyene monomers. Representative of such compounds include 1,4-hexanediene, dicyclopentadiene, bicyclco(2,2,1) hepta-2,5-diene, commonly known as norbornadiene as well as the alkenyl norbornenes wherein the alkenyl group contains 1–20 carbon atoms and preferably 1–12 carbon atoms. Examples of some of the latter compounds includes 5-methylene-2-norbornene, 5-ethylidene-2-norbornene, vinyl norbornene as well as alkyl norbornadienes.

Also included among the ethylene-propylene polymers used in the concepts of the present invention are those EPM and EPDM polymers which have been functionalized by means of a free radical graft reaction or a graft polymerization reaction. Such grafted polymers are themselves well known to those skilled in the art.

The graft monomer for functionalizing an EPM or EPDM interpolymer are the derivatives of olefinically unsaturated carboxylic monomers such as, maleic anhydride, acrylic or methacrylic acid, or their esters, graft monomers which are likewise known to those skilled in the art. Typically, acrylic and methacrylic acid derivative contain 4 to 16 carbon atoms. Particularly preferred among the group of acrylic or methacrylic graft monomers are glycidyl methacrylate, methylacrylate, methylmethacrylate, ethylmethacrylate and aminopropylmethacrylate, and acrylamide.

Another group of graft monomers which can be used to functionalize an EPM or EPDM interpolymer are vinyl amines containing 2 to 25 carbon atoms, and preferably heterocyclic vinyl amines. Such amines are themselves known as functionalizing graft monomers and include allylamines, N-vinylpyridines, N-vinylpyrrolidones, vinyl lactams, vinylcarbazoles, vinylimidazoles and vinylthiazoles as represented by 2-vinylpyridine, N-vinylpyrrolidone, vinyl caprolactam, 1-vinylimidazole, allylamine, 4-methyl-5-vinylthiazole and 9-vinylcarbazole. Such graft monomers are described in detail in U.S. Pat. No. 4,340,689, the disclosure of which is incorporated herein by reference.

As it will be appreciated by those skilled in the art, other vinyl monomers described in the prior art as suitable for functionalizing such EPM and EPDM interpolymers may likewise be used in the practice of the present invention. Examples of such further vinyl compounds are the vinyl silanes and vinyl-benzyl halides as represented by vinyltrimethoxysilane, vinyldiethychlorosilane, vinylbenzylchloride and the like. Further descriptions of suitable silane graft monomers are described in U.S. Pat. No. 4,340,689, the disclosure of which is incorporated herein by reference.

As described above, the compositions of one embodiment of the present invention can be prepared by blending or simultaneously blending and shearing for example by coextrusion, as starting materials, two different ethylene-propylene polymers, one being characterized by low ethylene content and the other being characterized by a higher ethylene content. The ethylene-propylene polymers having the low ethylene content can have in one embodiment of the present invention a polymerized ethylene/propylene molar ratio in the range of about 35/65 to about 65/35, and preferably a molar ratio of about 50/50 to about 65/35. When incorporated into a blend for use as a viscosity index improver, a preferred molar ratio of ethylene to propylene is, in one embodiment, from about 50/50 to about 60/40. When the ethylene-propylene polymer also includes a third polyene monomer, the amount of the polyene monomer generally ranges from about 0.1 to about 10 percent, and preferably 0.2 to 0.5 percent by weight based on the total weight of the polymer. When, however, use is made of a preferred polyene monomer, such as vinyl norbornene, the most preferred range is from 0.1 to 1 percent by weight.

When the ethylene-propylene monomer has been grafted with a graft monomer to functionalize the ethylene-propylene polymer, either with or without a polyene termonomer, use is preferably made of from about 0.1 to about 6.0 percent by weight of the graft monomer, depending somewhat on the application of the final graft polymer.

The number average molecular weight of the low ethylene content ethylene-propylene polymer useful in an embodiment of the present invention generally ranges from about 20,000 to about 300,000 as measured by GPC in toluene at 80° C. In a preferred practice of the present invention, the low ethylene content ethylene-propylene polymer has a molecular weight distribution within the range of about 1.3 to 5. As is well understood by those skilled in the art, the molecular weight distribution, often referred to as $M_w/M_n$ is determined by gel permeation chromatography according to well understood techniques.

The second component used in preparing the composition of the present invention is one having a higher ethylene content. In a preferred practice of an embodiment of the present invention, the high ethylene content ethylene-propylene polymer can have a polymerized ethylene/propylene molar ratio ranging from about 65/35 to about 85/15. When incorporated into a blend for use as a viscosity index improver, a preferred molar ratio of ethylene to propylene is from about 80/20 to about 85/15. In general, the same quantities of polyene monomers and graft monomers are used in the preparation of the second, high ethylene content ethylene-propylene polymer as described above for the low ethylene content ethylene-propylene polymer. It will be understood, however, that the composition of the higher ethylene content polymer need not employ the same combination of monomers as is used in the low ethylene content ethylene-propylene polymer.

In a preferred practice of an embodiment of the present invention, the number average molecular weight of the higher ethylene content ethylene-propylene polymer likewise ranges from about 40,000 to about 300,000 as measured by GPC in toluene as described above. The molecular weight distribution of the high ethylene content ethylene-propylene polymer falls within the same range of about 1.3 to 5.

The low ethylene content ethylene-propylene polymer can be, as will be understood by those skilled in the art, a random copolymer which is essentially amorphous. As is well recognized by those skilled in the art, the degree of crystallinity of a polymer is most often determined by Differential Scanning Calorimetry, or DSC. By using that standard, the low ethylene content ethylene-propylene polymer useful in an embodiment of the present invention typically has less than 3 percent by weight crystallinity as determined by DSC. The higher ethylene content ethylene-propylene polymer useful in the present invention, on the other hand, has a higher degree of crystallinity, ranging up to about 25 percent as determined by DSC. Typically, the higher ethylene content polymer useful in the present invention has a degree of crystallinity ranging from about 6 to 20 percent as determined by DSC.

Thus, one of the features of the present invention is that the blending or simultaneous blending and shearing of the two components employed in preparing the composition of the invention results in the blending of an essentially amorphous ethylene-propylene copolymer with an ethylene-propylene copolymer that has a measurable degree of crystallinity (often referred to as "semicrystalline"). This represents an advantage in that the blending or simultaneous blending and shearing results in the formation of a solid polymer having little or no tendency to exhibit cold flow so typical of OCPs previously used as viscosity index improvers and other EP(D)M's or blends thereof polymerized to a similar molecular weight.

The relative proportions of the low ethylene content ethylene-propylene polymer and the higher ethylene content ethylene-propylene polymer depend, to some extent, on the application of the composition of the invention. In general, good results with respect to low temperature properties of a lubricant composition have been obtained when the weight ratio of the lower ethylene content component to the higher ethylene content component is from about 45/55 to about 10/90, and preferably from about 40/60 to about 30/70.

In carrying out the simultaneous blending and shearing in accordance with the concepts of one embodiment of the present invention, the two ethylene-propylene polymer components are contacted with each other under conditions of heat and mechanical work sufficient to create high shear conditions for a time sufficient to reduce the molecular weights and sometimes molecular weight distributions of those two components to a level desirable for the particular end use application. That operation can be carried out in a number of known types of plastic processing equipment such as single or twin screw extruders, a Banbury, as well as other mixers that have the capability of effecting the mechanical work on the components so that in the presence of an elevated temperature, reduction in the molecular weights and molecular weight distributions to the desired level is effected. The conditions of temperature, feed rate, and screw speed are determined, in part, by the molecular weight reductions desired as well as the process time desired, given the processing economics. In general, depending somewhat on the compositions of the components, processing temperatures within the range of 150° to 400° C. can be used, and preferably 175° to 320° C. A preferred embodiment makes use of a twin screw extruder.

The ethylene-propylene polymer components are generally conveniently in the form of bales which are chopped and supplied simultaneously to the extruder in which they are blended and can be simultaneously sheared. As will be appreciated by those skilled in the art, the components can also be supplied as either a pre-mixed bale or a pre-mixed chopped agglomerate form.

A nitrogen feed can be maintained at the feed section of the extruder to minimize the introduction of air.

The ground rubber bales can be fed to the twin screw extruder or other mixer along with 0.1 to 2 weight percent based on the total weight of blend polymers of an antioxidant to prevent excessive oxidation of the polymer blend during processing and storage. Choice of an antioxidant depends on the processing temperatures in the mixer as well as end use application.

The blended and sheared hot melt can generally be formed into pellets by a variety of process methods commonly practiced in the art of plastics processing. These included under water pelletization, ribbon or strand pelletization or conveyor belt cooling. When the strength of the hot melt is inadequate to form into strands, the preferred method is underwater pelletization. Temperatures during pelletization should not exceed 30° C. Optionally, a surfactant can be added to the cooling water during pelletization to prevent pellet agglomeration.

The water mixture of blended and sheared pellets can be conveyed to a dryer such as a centrifugal drier for removal of water. Pellets can be collected in a box or plastic bag at any volume for storage and shipment. Under some conditions of storage and/or shipment at ambient conditions, pellets may tend to agglomerate and stick together. These can be readily separated by mild mechanical methods to provide high surface area pellets for easy and quick dissolution into oil or blending with other materials such as rubbers and plastics.

It has been found in the practice of the present invention that the properties of the composition, after blending or simultaneously blending and shearing, differ markedly with respect to either of the two components employed in preparing the blend and also differ markedly from the properties of blends prepared from other polymers.

The following examples further illustrate aspects of the present invention but do not limit the present invention.

EXAMPLES

Samples of polymer blends according to an embodiment of the present invention were prepared and compared in lubricating oils to lubricating oils not containing the polymer blends of the present invention.

In one result of the comparisons, it was observed that coextruded blends, that is, polymer blends that were sheared after blending as opposed to pre-shearing by separate extrusion of each polymer, demonstrated better performance in terms of MRV, Gel Index, Gel Index temperature, and Dynamic viscosity. The following table illustrates data comparing a 60/40 mix of A+B having 81.5 mol % ethylene in the HEOCP component (i.e., component A). The coextruded materials are better than the separately extruded material as evidenced by MRV, Gel Index, Gel Index temperature, and Dynamic viscosity.

| PPD EXPT# | Coextruded MRV | Separately extruded MRV | Coextruded G.I. | Separately extruded G.I | Coextruded G.I. Temp | Separately extruded G.I. Temp | Coextruded DYN Vis | Separately extruded DYN Vis |
|---|---|---|---|---|---|---|---|---|
| 1 | 26912 | 31624 | <6 | 8.8 | −18 | −16 | 12600 | 15700 |
| 2 | 24885 | 26065 | <6 | 9.2 | −16 | −16 | 12700 | 14900 |
| 3 | 26973 | 29622 | <6 | 8.8 | −23 | −16 | 12600 | 17600 |
| 4 | 28215 | 30110 | <6 | 6.5 | −17 | −16 | 13500 | 17900 |
| 5 | 28514 | 29488 | <6 | 8.9 | −33 | −16 | 12400 | 16500 |

MRV TP-1 = Mini Rotary Viscometer
G.I. = Gel Index
G.I. Temp = Gel Index Temperature
DYN Vis = Dynamic Viscosity

| Crystallinity Data on HEOCP Samples | | | | | | | |
|---|---|---|---|---|---|---|---|
| HEOCP | | | | | | | |
| E mol % ETHYL DSC- Cryst. %* | 75 | 80 | 80.6 | 81.5 | 82.6 | TXA 6070 | O-8451 |
| 50 SSI Product | 9.38 | 16.5 | 18.89 | 21.14 | 21.6 | 15.4 | 2.1 |
| ~24 SSI Product | 9.1 | 17.37 | 19.29 | 23 | 25.24 | | |

HEOCP = high ethylene olefin copolymer
*= Determined from the cooling curve

The table below illustrates Blend results of different mix HEOCP/Amorphous polymers:

| HEOCP/ AMORP. | PP | Scanning Brookfield Data | | GI Temp. ° C. | Thermotron data @ −35 & −40 C. | Rheometry G' & G" cross over T ° C. |
|---|---|---|---|---|---|---|
| | | CCS −30 | GI | | | |
| 100% HEOCP | −27 | 4820 | 6.4 | −19 | Solid @ −35 & −40 | −8 |

-continued

| HEOCP/ AMORP. | PP | CCS -30 | GI | Scanning Brookfield Data GI Temp. ° C. | Rheometry Thermotron data @ -35 & -40 C. | G' & G" cross over T ° C. |
|---|---|---|---|---|---|---|
| 70/30 | -30 | 5097 | 8.5 | -19 | Very thick BF | -24 |
| 60/40 | -33 | 5060 | 9.3 | -19 | Thick BF | ~-30 |
| 58/42 | -33 | 5040 | 15 | -19 | Thick BF | ~-30 |
| 55/45 | -33 | 5047 | 9.7 | -19 | Thick BF | ~-30 |
| 52/48 | -30 | poor result | 7.3 | -8 | Thick BF | ~-30 |

CCS = Cold crank simulator
GI = Gel Index
GI Temp. = Gel Index Temperature
BF = But flows Based on the table above, a particularly preferred embodiment of the present invention is a 60/40 mix of HEOCP and amorphous olefin co-polymer. The 52/48 mix is not acceptable because the CCS result is considered poor/fail and the GI temperature is unacceptably high. Automakers and oil companies prefer a GI of 12 or below and GI numbers of 8 to 10 are more preferred. The 58/42 mix is not acceptable because of the high GI number. The 70/30 mix is acceptable, but less preferred than the 60/40 mix. The 100% HEOCP material has an unacceptably high risk of gelation due to poor PP, thermotron results, and the rheometry data.

Blend Study with a 10W40 Formulation

| E % | Mixture % | PPD | S.B GI | S.B. GIT | S.B. Vis. @ -25 | MRV TP-1 | YS |
|---|---|---|---|---|---|---|---|
| 75.1 | 70/30 | H-5789 | 10.3 | -12 | >50,000 | 165813 | 70 |
| 77.6 | 60/40 | H-5789 | 6.9 | -9 | 28,600 | 34591 | 10 |
| 80 | 70/30 | H-5789 | <6.0 | -16 | 21,300 | 20855 | 0 |
| 75.1 | 70/30 | P-392 | 16.7 | -11 | >50,000 | 406786 | 90 |
| 77.6 | 60/40 | P-392 | 6.7 | -9 | 43,900 | 60442 | 30 |
| 80 | 70/30 | P-392 | 7 | -12 | 27,400 | 23700 | 0 |
| 75.1 | 60/40 | XPD-292 | 18.1 | -11 | >50,000 | 83283 | 60 |
| 77.6 | 70/30 | XPD-292 | 13.9 | -8 | >50,000 | 49619 | 40 |
| 80 | 60/40 | XPD-292 | <6 | -11 | 41,500 | 25458 | 0 |
| 75.1 | 60/40 | P-385 | 10.2 | -12 | >50,000 | 91461 | 60 |
| 77.6 | 70/30 | P-385 | 11.1 | -9 | >50,000 | 57151 | 60 |
| 80 | 60/40 | P-385 | 8 | -9 | 43,600 | 27799 | 0 |

The amorphous polymer used in all formulations was HiTEC® 5721 which has an E/P ratio of about 60/40 mol %.

A critical test parameter in the above table is the YS, which is the Yield Stress. A pass value is "0", or zero. Positive numbers are generally considered a "fail". As can be seen, a "0" or pass is obtained for the 60/40 and 70/30 polymer blends of the present invention in which the percent ethylene (E mol %) in the HEOCP of the mixture is 80. Polymer blends in which the percent ethylene (E mol %) in the HEOCP of the mixture is below 80 failed the blend study test.

Blend Data of 10W-40 and 5W-30 formulations

| Exp. # | E % | Base Oil | 100C Vis- cSt | Vis Grade | CCS cP | Y.S. | MRV cP | Gel Index | Temp | Viscosity @ -25 |
|---|---|---|---|---|---|---|---|---|---|---|
| | 78.9 | RLOP | 14.378 | 10W40 | 3251 | 0 | 31,200 | <6.0 | -17 | 18,000 |
| | 80 | RLOP | 14.276 | 10W40 | | 0 | 23,139 | 6.1 | -10 | 23,500 |
| | 80-G | RLOP | 14.19 | 10W40 | 3072 | 0 | 20,483 | 4.9 | -14 | 17,500 |
| | 80.6 | RLOP | 14.5 | 10W40 | 3015 | 0 | 25,735 | 4.5 | -19 | 20,400 |
| | 81.5 | RLOP | 14.55 | 10W40 | 3164 | 0 | 27,268 | 4.1 | -10 | 19,400 |
| | 82.6 | RLOP | 15.97 | 10W40 | | 0 | 26,846 | 3.2 | -15 | 20,300 |
| | 84 | RLOP | 14.68 | 10W40 | 3106 | 0 | 18,538 | 4.8 | -16 | 16,900 |
| | 80 | Motiva | 14.22 | 10W40 | 3010 | 0 | 20,855 | <6 | -16 | 21,300 |
| | 78.9 | Penn Spec. | 10.27 | 5W30 | 2123 | 0 | 14,927 | 10.3 | -20 | 5,900 |
| | 80 | Penn Spec. | 10.23 | 5W30 | 2100 | 0 | 12,951 | 7.6 | -20 | 6,000 |
| | 80-G | Penn Spec. | 10.26 | 5W30 | 2169 | 0 | 11,232 | 6 | -19 | 5,300 |
| | 80.6 | Penn Spec. | 10.74 | 5W30 | 2203 | 0 | 12,313 | 4.5 | -21 | 5,200 |
| | 81.5 | Penn Spec. | 10.84 | 5W30 | 2202 | 0 | 12,669 | 5.7 | -21 | 4,700 |
| | 82.6 | Penn Spec. | 10.76 | 5W30 | 2223 | 0 | 12,325 | 6.2 | -7 | 5,400 |
| | 84 | Penn Spec. | 10.64 | 5W30 | 2211 | 0 | 11,080 | 3.4 | -25 | 5,700 |
| | 78.9 | Motiva HVI | 10.41 | 5W30 | 2393 | 0 | 18,451 | 10.5 | -18 | 6,700 |
| | 80 | Motiva HVI | 10.51 | 5W30 | 2413 | 0 | 16,846 | 9.9 | -19 | 6,900 |
| | 80-G | Motiva HVI | 10.6 | 5W30 | 2383 | 0 | 14,957 | 7.2 | -16 | 6,100 |
| | 80.6 | Motiva HVI | 10.69 | 5W30 | 2303 | 0 | 12,405 | 3.4 | -30 | 5,300 |
| | 81.5 | Motiva HVI | 10.79 | 5W30 | 2307 | 0 | 12,934 | 4.4 | -10 | 5,000 |
| | 82.6 | Motiva HVI | 10.8 | 5W30 | 2300 | 0 | 12,776 | 4.6 | -17 | 5,400 |
| | 84 | Motiva HVI | 10.66 | 5W30 | 2460 | 0 | 13,380 | 3.3 | -40 | 6,000 |
| | 80 | EHC-45 | 10.46 | 5W30 | 2423 | 0 | 27,474 | 11.9 | -18 | 11,900 |
| | 80-G | EHC-45 | 10.86 | 5W30 | 2412 | 0 | 31,557 | 12.4 | -18 | 7,600 |
| | 80.6 | EHC-45 | 10.67 | 5W30 | 2384 | 0 | 40,669 | 10.7 | -18 | 8,700 |
| | 81.5 | EHC-45 | 10.8 | 5W30 | 2407 | 0 | 38,769 | 9.6 | -19 | 6,600 |
| | 82.6 | EHC-45 | 10.61 | 5W30 | 2389 | 0 | 40,338 | 7.1 | -7 | 6,200 |
| | 84 | EHC-45 | 10.59 | 5W30 | 2410 | 0 | 37,898 | 4.9 | -21 | 6,600 |
| | 78.9 | Chevron SR | 10.45 | 5W30 | 2232 | 0 | 17,565 | 39.9 | -7 | 6,400 |
| | 80 | Chevron SR | 10.42 | 5W30 | 2242 | 0 | 13,943 | 6 | -19 | 6,100 |
| | 80-G | Chevron SR | 10.39 | 5W30 | 2281 | 0 | 12,184 | 6 | -19 | 5,500 |
| | 80.6 | Chevron SR | 10.43 | 5W30 | 2261 | 0 | 12,398 | 3.5 | -24 | 5,000 |
| | 81.5 | Chevron SR | 10.52 | 5W30 | 2276 | 0 | 12,155 | 3.3 | -8 | 5,200 |
| | 82.6 | Chevron SR | 10.61 | 5W30 | 2299 | 0 | 12,019 | 5 | -8 | 5,500 |
| | 84 | Chevron SR | 10.52 | 5W30 | 2302 | 0 | 12,157 | 3.2 | -39 | 6,000 |

The above table shows the blend data of a 60/40 mix of A+B having different mol % ethylene in the HEOCP component (i.e., component A). The table includes data for both 5W30 and 10W40 grades. From the data, it can be concluded that ethylene mol % in HEOCP component at about 80 or more provides good low temperature properties in terms of MRV, Gel Index and CCS. HEOCP having 78.9 mol % ethylene show relatively inferior results in terms of MRV and Gel Index.

Other embodiments of the present invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A lubricating oil composition comprising a major amount of oil of a lubricating viscosity, a performance additive package appropriate for the quality and performance levels, a pour point depressant, and a viscosity index improving amount of an oil soluble polymer mixture comprising: an ethylene-propylene polymer blend having a number average molecular weight within the range of about 20,000 to about 300,000 and a molecular weight distribution within the range of about 1.3 to about 5 prepared by the process comprising blending or simultaneously blending and shearing:

(a) an essentially amorphous low ethylene content ethylene-propylene polymer containing an ethylene to propylene mole ratio within the range of 35/65 to 65/35, having a number average molecular weight within the range of about 40,000 to about 300,000 and a molecular weight distribution within the range of about 1.3 to about 5.0; and (b) a partially crystalline higher ethylene content ethylene-propylene polymer containing an ethylene to propylene molar ratio within the range of about 65/35 to about 85/15, having 3–25 weight percent crystallinity, and, having a number average molecular weight within the range of about 40,000 to about 300,000 and a molecular weight distribution within the range of about 1.3 to about 5.0;

whereby the blending, or simultaneous blending and shearing, is carried out under conditions of heat and mechanical work sufficient to create high shear conditions for a time sufficient to reduce the molecular weight and molecular weight distribution of the blend of (a) and (b), wherein the weight ratio of the low ethylene content ethylene-propylene polymer (a) to the higher ethylene content ethylene-propylene polymer (b) is within the range of about 45/55 to about 10/90.

* * * * *